(12) United States Patent
Vittoz et al.

(10) Patent No.: US 8,807,042 B2
(45) Date of Patent: Aug. 19, 2014

(54) MOBILE UNIT AND INSTALLATION FOR TRANSPORTATION OF AT LEAST ONE PASSENGER

(75) Inventors: Thierry Vittoz, Chimilin (FR); Philippe Desflammes, Gruffy (FR)

(73) Assignee: Sigma Composite, Veyrins Thuellin (FR)

( * ) Notice: Subject to any disclaimer, the term of this patent is extended or adjusted under 35 U.S.C. 154(b) by 162 days.

(21) Appl. No.: 13/447,781

(22) Filed: Apr. 16, 2012

(65) Prior Publication Data

US 2012/0260816 A1    Oct. 18, 2012

Related U.S. Application Data

(60) Provisional application No. 61/476,001, filed on Apr. 15, 2011.

(51) Int. Cl.
*A63G 27/00* (2006.01)
*A63G 27/02* (2006.01)

(52) U.S. Cl.
CPC ............... *A63G 27/00* (2013.01); *A63G 27/02* (2013.01)
USPC .................................. 104/76; 104/74; 472/45

(58) Field of Classification Search
CPC .................................................. A63G 27/00
USPC ............... 104/74, 75, 77, 76, 78; 472/44, 45; 105/149.2, 149.1, 156

See application file for complete search history.

(56) References Cited

U.S. PATENT DOCUMENTS

| | | | | | |
|---|---|---|---|---|---|
| 1,481,705 | A | * | 1/1924 | Gimeno | 384/559 |
| 1,935,558 | A | * | 11/1933 | Haskell | 472/22 |
| 3,869,119 | A | * | 3/1975 | Oxley | 472/45 |
| 2011/0207539 | A1 | | 8/2011 | Bussink et al. | |

FOREIGN PATENT DOCUMENTS

| | | |
|---|---|---|
| CA | 2 646 613 | 6/2009 |
| EP | 2 075 043 A1 | 7/2009 |
| EP | 2 248 565 A1 | 11/2010 |
| JP | A-2002-159758 | 6/2002 |
| JP | A-2002-355446 | 12/2002 |

OTHER PUBLICATIONS

Oct. 15, 2013 Written Opinion of the International Searching Authority issued in International Application No. PCT/FR2011/000227.

* cited by examiner

*Primary Examiner* — Mark Le
(74) *Attorney, Agent, or Firm* — Oliff PLC

(57) ABSTRACT

A mobile unit for transportation of at least one passenger comprises a car accommodating this passenger and an assembly device for fitting this car on a mobile support in rotary manner with respect to a substantially horizontal axis of rotation. The assembly device comprises a single first crown rigidly secured to the car and assembled by a bearing to a second crown performing securing to the mobile support.

13 Claims, 4 Drawing Sheets

MOBILE UNIT AND INSTALLATION FOR TRANSPORTATION OF AT LEAST ONE PASSENGER

BACKGROUND OF THE INVENTION

The invention relates to the field of transportation of passengers in cars driven in convoy and finds its application in particular in amusement ride installations such as those commonly referred to by the term "big wheel". More precisely, the invention relates to a mobile unit for transporting at least one passenger of the type comprising a car for accommodating this passenger and a device for fitting this car in rotary manner with respect to a substantially horizontal axis of rotation on a mobile support.

The invention also relates to an installation for transportation of passengers.

STATE OF THE ART

Amusement ride installations of big wheel or Ferris wheel type, as well as others, use cars driven along a path with a variable slope. These cars can be suspended so that their own weight directs them in suitable manner with respect to the vertical, ensuring that their respective floors remain horizontal.

Each car can also be mounted on a mobile support having an orientation that follows the variations of slope of the travelling path. An amusement ride apparatus having such an arrangement is described in European Patent application EP-2 075 043. Any car of this amusement ride apparatus is supported by a carriage to which it is associated by means of a pair of vertical annular bearings. The two bearings of this pair are shifted with respect to one another in the direction of their common axis of rotation, and they are placed withdrawn towards the inside with respect to the external envelope of the car which they hold together. Each car of the apparatus proposed in above-mentioned Patent application EP-2 075 043 can thus rotate on a horizontal axis with respect to its support so that, when variations of the slope of its path occur, its orientation can be constantly corrected with respect to this support and be kept substantially constant with respect to the horizontal.

In the above-mentioned application EP-2 075 043, the two bearings of a car are rigidly connected to one another by a portion of car, which may be subject to geometric defects. These two bearings are further fixed to one and the same support, i.e. to one and the same carriage, with an arrangement which may also be subject to geometric defects. It results from the foregoing that the relative position of the bearings with respect to one another is determined by two different structures, i.e. in hyperstatic manner. Hence, geometric defects lead to the presence of stresses, which are all the more detrimental to the assembly as they are dynamic, regularly reaching maxima, since these stresses fluctuate at the same time as the car rotates on itself and the relative angular position of the two different structures each rigidly joining the two bearings to one another varies.

These dynamic stresses make the assembly work, and redhibitory slapping noises and repeated breakages of parts of assemblies are to be deplored. One solution to remedy these shortcomings has been to adopt an arrangement introducing a degree of freedom in the assembly. Incorporating this arrangement involves extra cost and greater complexity, and does not constitutes a totally satisfactory solution.

OBJECT OF THE INVENTION

The object of the invention is at least to enable a reduction of the mechanical fatigue within an assembly where a rotary car rotates with respect to its support.

According to the invention, this object is achieved by means of a transportation unit of the above-mentioned type in which the assembly device comprises a single first crown rigidly secured to the car and assembled by means of a bearing to a second crown performing securing to the mobile support.

The first crown is the only part via which the car is held. Such a crown can be achieved with small geometric defects. Furthermore, a single bearing can be used for assembly on the support.

The invention therefore allows an arrangement that is only slightly or not at all hyperstatic at the level of the rotary assembly device in manner, thereby enabling the above-mentioned object to be achieved.

Furthermore, in the transportation unit defined in the above, it is possible to use a single bearing. If so, this in particular results in the advantage of substantial savings compared with the case where a car is mounted by means of several bearings.

The assembly device advantageously surrounds the car and the second crown is radially enlarged or staggered towards the outside, i.e. in centrifugal manner, with respect to the car, so that this car can be engaged in the second crown, up to the first crown, when assembly of the mobile transportation unit is performed.

Such an arrangement facilitates installation, dismantling and maintenance of a car, and also of the bearing. For comparison purposes, installation and maintenance of the cars provided in the amusement ride apparatus of above-mentioned Patent application EP-2 075 043 are complicated by the fact that each car can only be taken down when it has been separated into several parts and that access to one of the two assembly bearings of any car also requires this car to be broken down into several parts.

Advantageously, the bearing is enlarged or staggered radially towards the outside, i.e. in centrifugal manner, with respect to the car, so that this car can be engaged in the bearing, up to the first crown, when assembly of the mobile transportation unit is performed.

Such an arrangement facilitates installation, dismantling and maintenance of the bearing and/or of the car.

The bearing advantageously comprises a first annular element fixed to the first crown and a second annular element fixed to the second crown. These first and second annular elements delineate at least one raceway of running elements of the bearing between them. Advantageously, the first annular element of the bearing surrounds the second annular element of the bearing.

Advantageously, the first and second crowns are axially shifted from one another, which reduces the diametral space occupation.

Advantageously, the car comprises a frame of which the first crown forms a part.

Advantageously, the frame comprises at least two parts, i.e. a first part comprising a first mounting flange and a second part comprising a second mounting flange. The first and second mounting flanges advantageously hold the first and second parts of the frame together, by being fixed to one another, and define said first crown.

Advantageously, said bearing is the only bearing associating the first and second crowns to one another.

Advantageously, said first and second crowns constitute the only pair of crowns one and the other crown of which are held together by a bearing and are respectively a crown for securing to the mobile support and a crown rigidly secured to the car.

The object of the invention is also an installation for transportation of passengers that comprises at least one mobile transportation unit for transportation of at least one passenger and at least one driven support which acts as support for this car. This mobile transportation unit is as defined in the foregoing.

BRIEF DESCRIPTION OF THE DRAWINGS

Other possible advantages and features will become more clearly apparent from the following description of a particular embodiment of the invention given for non-restrictive example purposes only and represented in the accompanying drawings, among which.

DESCRIPTION OF A PREFERRED EMBODIMENT OF THE INVENTION

Figure 1:
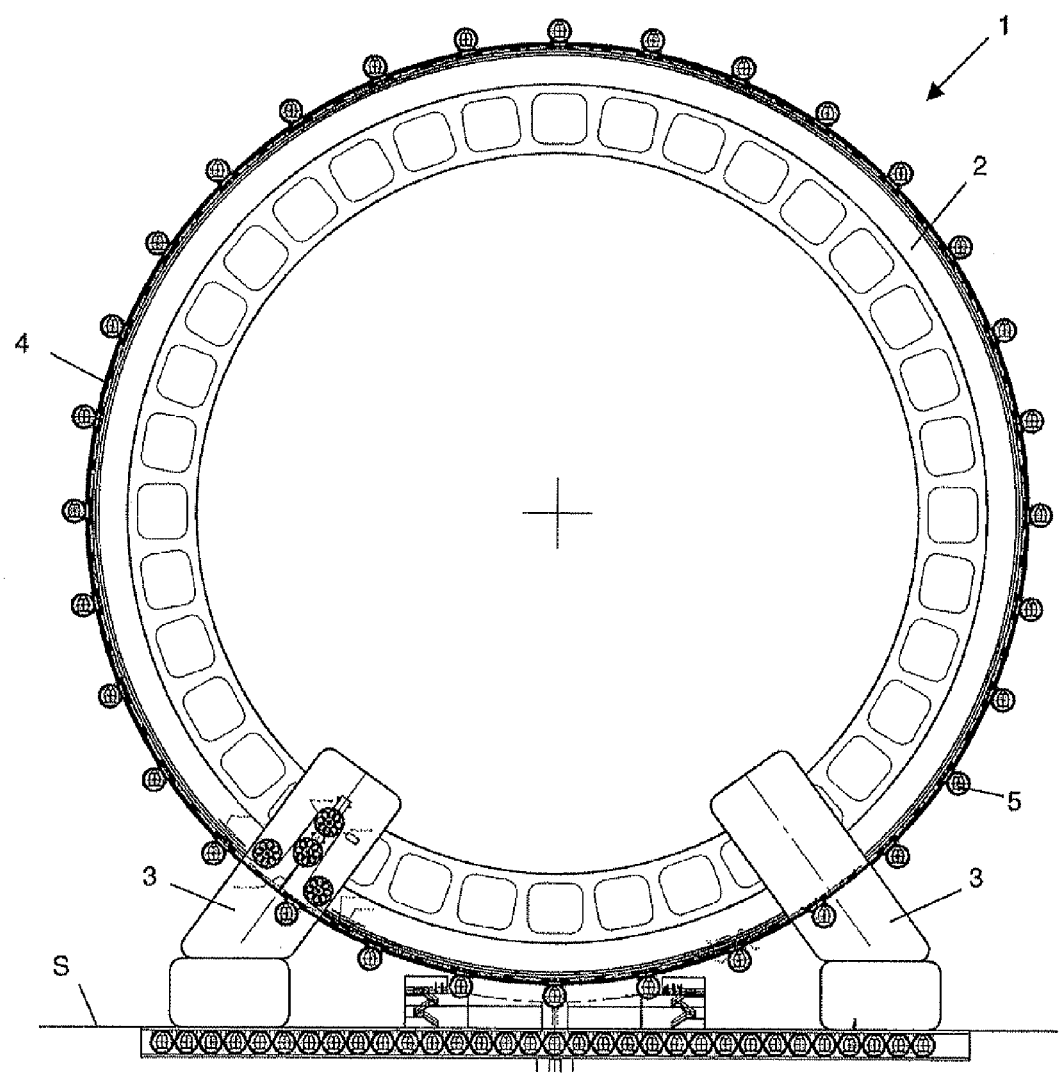
FIG. 1 is a side view of an installation in accordance with the invention and which comprises a noria of mobile units.

In FIG. 1, an amusement ride apparatus of the vertical big wheel type is designated by the reference 1. It comprises a fixed central structure 2 which is supported by two feet 3 anchored on the ground S. In the illustrated example and in non-restrictive manner, fixed central structure 2 presents the form of a crown supporting a circular guiding path 4.

Figure 2:
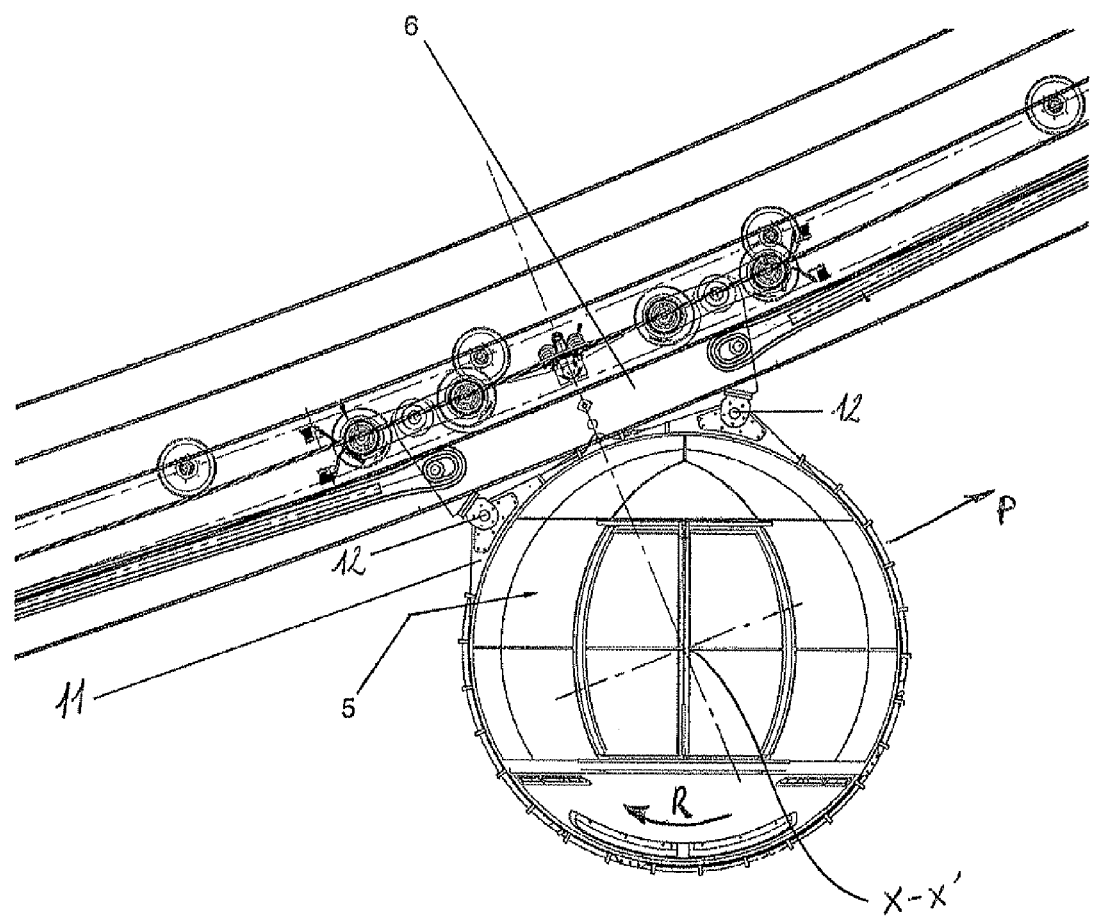
FIG. 2 is an enlargement of a portion which is extracted from FIG. 1 and where only one of the mobile units can be seen.

Path 4 guides a train of identical carriages each of which supports a car 5. In FIG. 2, such a carriage is referenced 6. The carriage train is moved along path 4 by a drive system by means of a cable, which is known as such and an example of which is to be found in European Patent application EP-2 075 043.

Car 5 is rotary and is held by a peripheral assembly device 10 by means of which it is fitted on carriage 6 so as to be able to rotate on a substantially horizontal axis X-X'.

In the following and in the appended claims, the terms "axial", "radial", and similar terms refer to the axis of rotation X-X'.

Axis X-X' is substantially orthogonal to the direction of progression of carriage 6 along path 4. In this way, following a variation of the slope of this path 4 during progression P of carriage 6, a variation of the incline of this carriage with respect to the horizontal can be compensated by a rotation R of car 5 on its axis of rotation X-X' so that the floor of this car 5 remains substantially horizontal. The angular movement of car 5 can be produced by any suitable means such as an electrically-driven and electronically-controlled stabilizer embarked on board car 5.

Assembly device 10 surrounds car 5 and comprises a single pair of crowns which can rotate with respect to one another and one of which is more precisely a securing crown 11 rigidly fixed to carriage 6 by three bolts 12. The other crown of this single pair is the rotary crown, the axis of rotation of which is axis X-X'. It is visible and referenced 13 in FIGS. 3 and 4 where, for the sake of clarity, only assembly device 10 and frame 14 of car 5 are represented.

Figure 3:
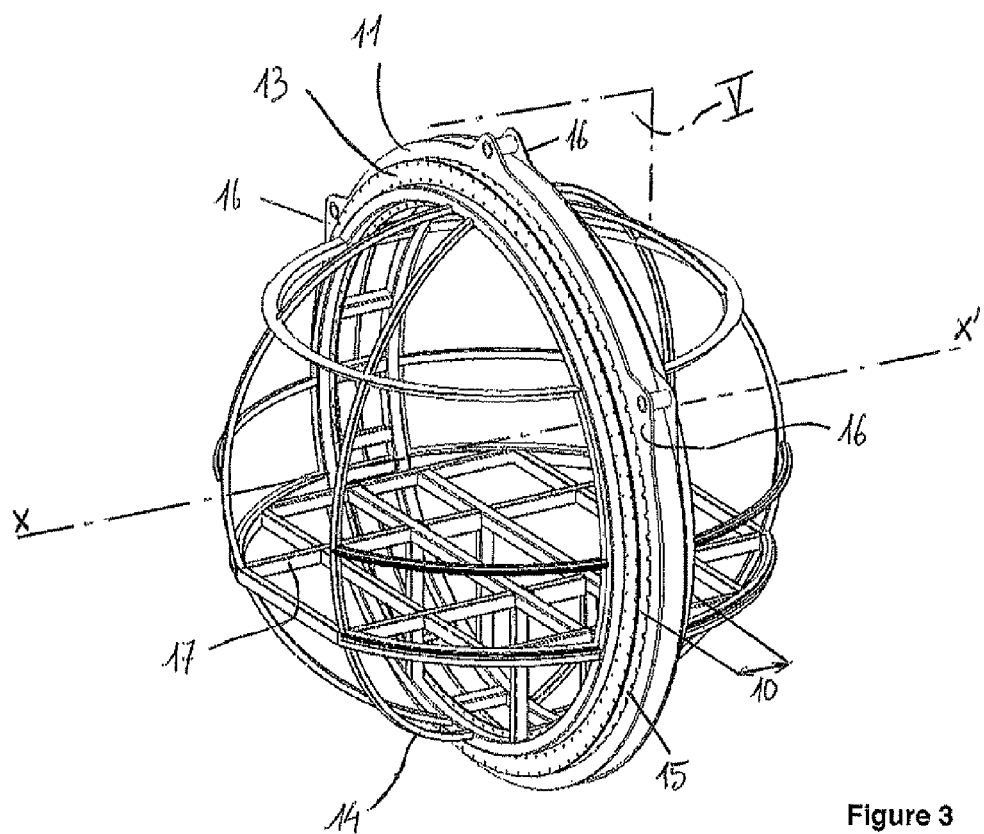
FIG. 3 is a perspective view of a sub-assembly in accordance with the invention comprising the bare frame of a car constituting the mobile unit shown in FIG. 2, as well as the device by means of which this frame is designed to be mounted with rotation on a carriage.
Figure 4:
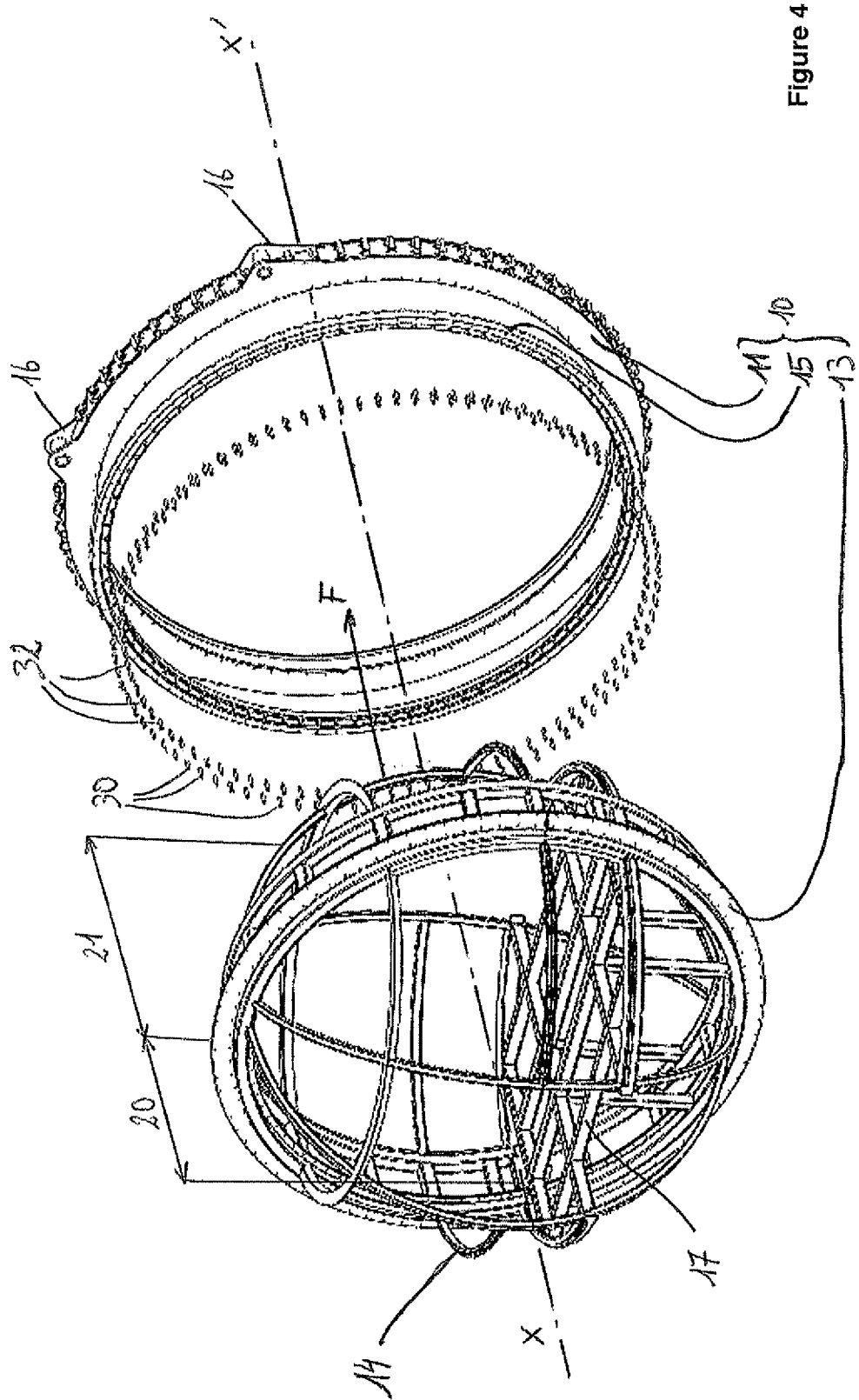
FIG. 4 is an exploded view and represents the same sub-assembly as FIG. 3.

As can be seen in FIGS. 3 and 4, an annular bearing 15 having an axis of rotation X-X' forms part of assembly device 10 and holds crown 11 and rotary crown 13, which is rigidly fixed to car 5, together. Bearing 15 and the two crowns 11 and 13 are substantially coaxial and centred on axis of rotation X-X'.

Securing crown 11 has three fixing lugs 16 angularly offset from one another, each of the latter delineating a hole for passage of the shank of a bolt 12.

Frame 14 presents the form of a metal framework which is designed to support an envelope of car 5 and which has a horizontal structure 17 which serves the purpose of supporting a horizontal floor that is not represented.

Figure 5:
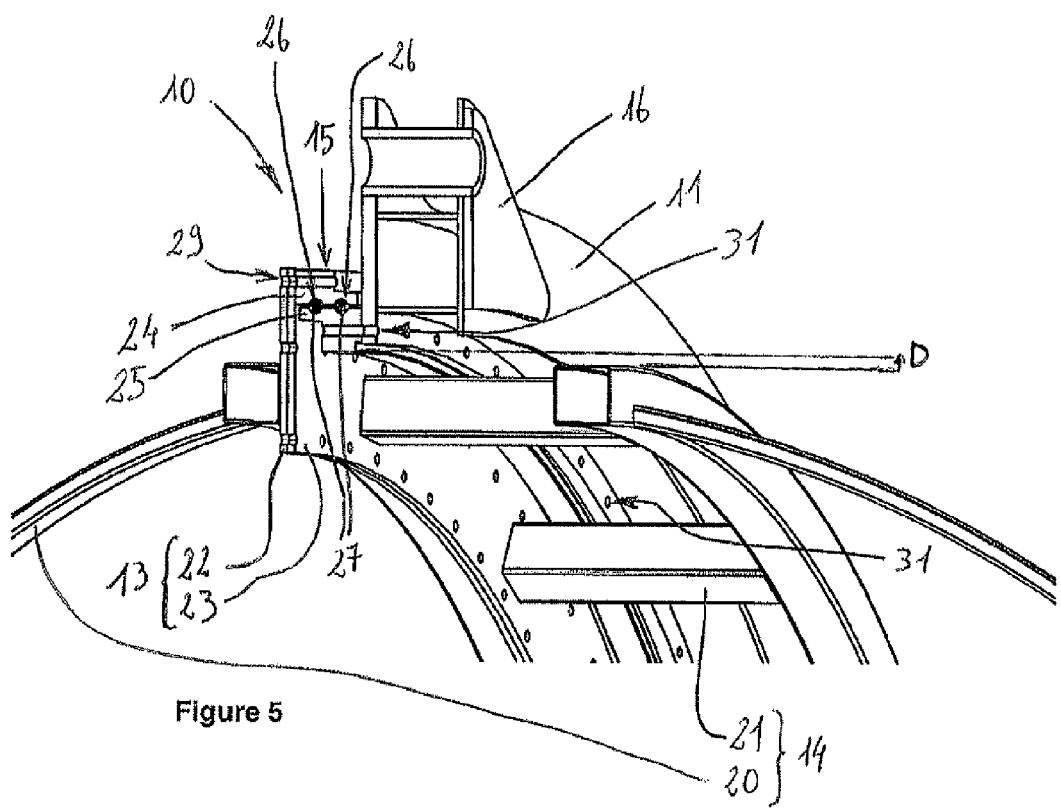
FIG. 5 is a partial view, in perspective and in cross-section along the plane noted V in FIG. 3.

As can be seen in FIG. 5, securing crown 11 is a mechanically welded part where two tubular portions rigidly associate two circular plates.

Frame 14 is made up of two parts 20 and 21 bolted to one another, each of which is a mechanically welded assembly of metal elements. More precisely, a mounting flange 22 constituting part 20 and a mounting flange 23 constituting part 21 keep the two parts 20 and 21 of frame 14 assembled while being bolted to one another. These mounting flanges 22 and 23 together further define rotary crown 13. They therefore fulfil two assembly functions at the same time, which is advantageous in particular in terms of simplification and weight. Each of the two parts 20 and 21 has dimensions compatible with road transport by truck.

Bearing 15 comprises two annular elements 24 and 25 which delineate two circular and coaxial raceways 26 between them. A set of rolling elements, which are ball-bearings 27 in the example represented while at the same time also being able to present other shapes such as the shape of a roller, runs in each raceway 26.

Annular element 25 is fixed to securing crown 11 by a set of bolts which are not represented in FIG. 5, the shanks of these bolts passing through holes 31. These bolts are referenced 32 in FIG. 4.

Annular element 24 is secured to rotary crown 13 by a set of bolts which are not represented in FIG. 5, the shanks of these bolts passing through holes 29. These bolts are referenced 30 in FIG. 4.

Securing crown 11 and bearing 15 are radially shifted or staggered towards the outside with respect to car 5, as symbolized by arrow D. On account of this, this car 5 can be engaged in bearing 15 and also in securing crown 11, along axis of rotation X-X' and in the direction of arrow F in FIG. 4, up to crown 13. Car 5 can thus be engaged in particular when installation of the latter is performed, which is thereby facilitated. The reverse procedure can also be carried out when dismantling car 5, which facilitates the number of operations, in particular this dismantling and maintenance of bearing 15 or even replacement of the latter. This preventive maintenance comprises visual inspection of bearing 15, lubrication of the latter and replacement of its sealing gaskets.

FIG. 4 facilitates understanding of the advantages which have been set out in the foregoing. It can be clearly seen from this figure that on at least one side of rotary crown 13, i.e. on the side where securing crown 11 and bearing 15 are located, car 5 has transverse cross-sections having outer dimensions that are smaller than the dimensions for the passages that successively delineate this bearing 15 and securing crown 11. On account of this, fitting of the car by engagement along F is easy.

Car 5 can further be assembled even if bearing 15 intended to equip and secure the latter is not yet available. On account of this, assembly of cars 5 and procurement of bearings 15 can be dissociated from one another. Management of a construction of an amusement ride apparatus 1 is thereby greatly facilitated.

The invention is not limited to the embodiment described in the foregoing. In particular, in the case where the path taken by the cars is in the shape of a vertical circle, the invention can be implemented both in the case described in the foregoing of a fixed central structure 2, and in the case of a Ferris wheel where the central structure rotates on itself and presents the form of a wheel comprising spokes and a rim connected by these spokes to a central bearing of horizontal axis. In the case of such a Ferris wheel, there is no carriage 6 and crown 11 is fixed directly to the rim of the wheel.

The bearing between the two crowns can further have a single raceway.

The invention claimed is:

1. A mobile unit for transportation of at least one passenger, comprising:
   a car for accommodating the passenger, and
   an assembly device for fitting the car on a mobile support in rotary manner with respect to a substantially horizontal axis of rotation, wherein
      the assembly device comprises a single first crown rigidly secured to the car and assembled by means of a bearing to a second crown performing securing to the mobile support,
      the assembly device extends entirely around the car,
      the car comprises a frame of which the first crown forms a part,
      the frame comprises at least two parts, a first part comprising a first mounting flange and a second part comprising a second mounting flange,
      the first and second mounting flanges hold the first and second parts of the frame together, by being fixed to one another, and define said first crown, and
      the first and second mounting flanges extend entirely around the car.

2. The mobile unit according to claim 1, wherein the assembly device surrounds the car, the second crown being radially shifted towards an outside with respect to the car in such a way that the car can be engaged in the second crown up against the first crown, when assembly of the mobile transportation unit takes place.

3. The mobile unit according to claim 2, wherein the bearing is radially shifted towards an outside with respect to the car so that the car can be engaged in the bearing up against, the first crown, when assembly of the mobile transportation unit takes place.

4. The mobile unit according to claim 1, wherein the bearing comprises a first annular element fixed to the first crown and a second annular element fixed to the second crown, these first and second annular elements delineating between them at least one raceway of running elements of the bearing, the first annular element of the bearing surrounding the second annular element of the bearing.

5. The mobile unit according to claim 1, wherein the first and second crowns are axially shifted from one another.

6. The mobile unit according to claim 1, wherein said bearing is the only bearing associating the first and second crowns to one another.

7. The mobile unit according to claim 1, wherein said first and second crowns constitute the only pair of crowns, the first and second crowns are held together by a bearing and are respectively the second crown for securing to the mobile support and the first crown rigidly secured to the car.

8. An installation for transportation of passengers, comprising:
   at least one mobile unit of claim 1 for transportation of at least one passenger, and
   at least one driven support which acts as support for the car.

9. The mobile unit according to claim 1, wherein the first crown is annular, enabling a complete rotation of the car.

10. The mobile unit according to claim 1, wherein a plane defined by the first crown is perpendicular to the substantially horizontal axis of rotation.

11. The mobile unit according to claim 1, wherein the substantially horizontal axis of rotation passes through a center of the first crown.

12. The mobile unit according to claim 1, wherein the first crown and the second crown extend entirely around the car and define planes that are perpendicular to the substantially horizontal axis of rotation.

13. The mobile unit according to claim 1, wherein the first crown and the second crown are radially offset with the second crown extending outwards from the first crown.

* * * * *